United States Patent
Miyazaki et al.

(10) Patent No.: US 6,872,051 B2
(45) Date of Patent: Mar. 29, 2005

(54) FASTENER AND FASTENING METHOD (75) Inventors: Yoshiaki Miyazaki, Tokyo (JP); Hiroshi Uchida, Tokyo (JP); Kenichi Kajiwara, Tokyo (JP); Kikuichi Mori, Tokyo (JP); Chitoshi Morita, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/451,146

(22) PCT Filed: Dec. 28, 2001

(86) PCT No.: PCT/JP01/11629
§ 371 (c)(1),
(2), (4) Date: Jun. 27, 2003

(87) PCT Pub. No.: WO02/053925
PCT Pub. Date: Jul. 11, 2002

(65) Prior Publication Data
US 2004/0047729 A1 Mar. 11, 2004

(30) Foreign Application Priority Data
Dec. 28, 2000 (JP) ........................................ 2000-400974

(51) Int. Cl.[7] ............................................. F04D 29/42
(52) U.S. Cl. .................................. 415/213.1; 415/214.1
(58) Field of Search ............................ 415/213.1, 214.1

(56) References Cited

U.S. PATENT DOCUMENTS

| | | | |
|---|---|---|---|
| 3,653,719 A | * 4/1972 | Osawa et al. | 301/37.372 |
| 4,775,295 A | 10/1988 | Starke et al. | |
| 4,806,080 A | * 2/1989 | Mizobuchi et al. | 417/353 |
| 4,830,573 A | * 5/1989 | Campbell | 415/177 |

FOREIGN PATENT DOCUMENTS

| | | | |
|---|---|---|---|
| DE | 41 31 651 | 3/1993 | |
| DE | 29703289 U1 | * 7/1997 | F16L/23/16 |
| DE | 196 39 007 | 3/1998 | |
| DE | 198 38 798 | 3/2000 | |
| GB | 2 180 905 | 4/1987 | |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

The present invention relates to a fastener and a fastening method for joining together two or more members including at least one complicate-shaped plate. A fastener comprises a cap nut (20) having a main body and a thin-walled portion (24) projecting from the main body, and a bolt (30) screwed into the cap nut (20). The cap nut (20) is fixed to a plate-like member (12) by inserting the thin-walled portion (24) into a through-hole (12a) of the plate-like member (12) and caulking the thin-walled portion (24).

5 Claims, 7 Drawing Sheets

FASTENER AND FASTENING METHOD

TECHNICAL FIELD

The present invention relates to a fastener and a fastening method for fastening two or more members, and more particularly to a fastener and a fastening method for joining together two or more members including at least one complicate-shaped plate, for example, joining a component of a pump casing manufactured by press-forming and a flange of a motor in a pump apparatus.

BACKGROUND ART

In a pump apparatus, in order to make the pump apparatus lightweight and lower manufacturing cost of the pump apparatus, it has been practiced to form a pump casing by assembling pressed products which are manufactured by press-forming of sheet metal such as stainless steel plate, and then to amount this pump casing on a flange of a motor.

Figure 7:
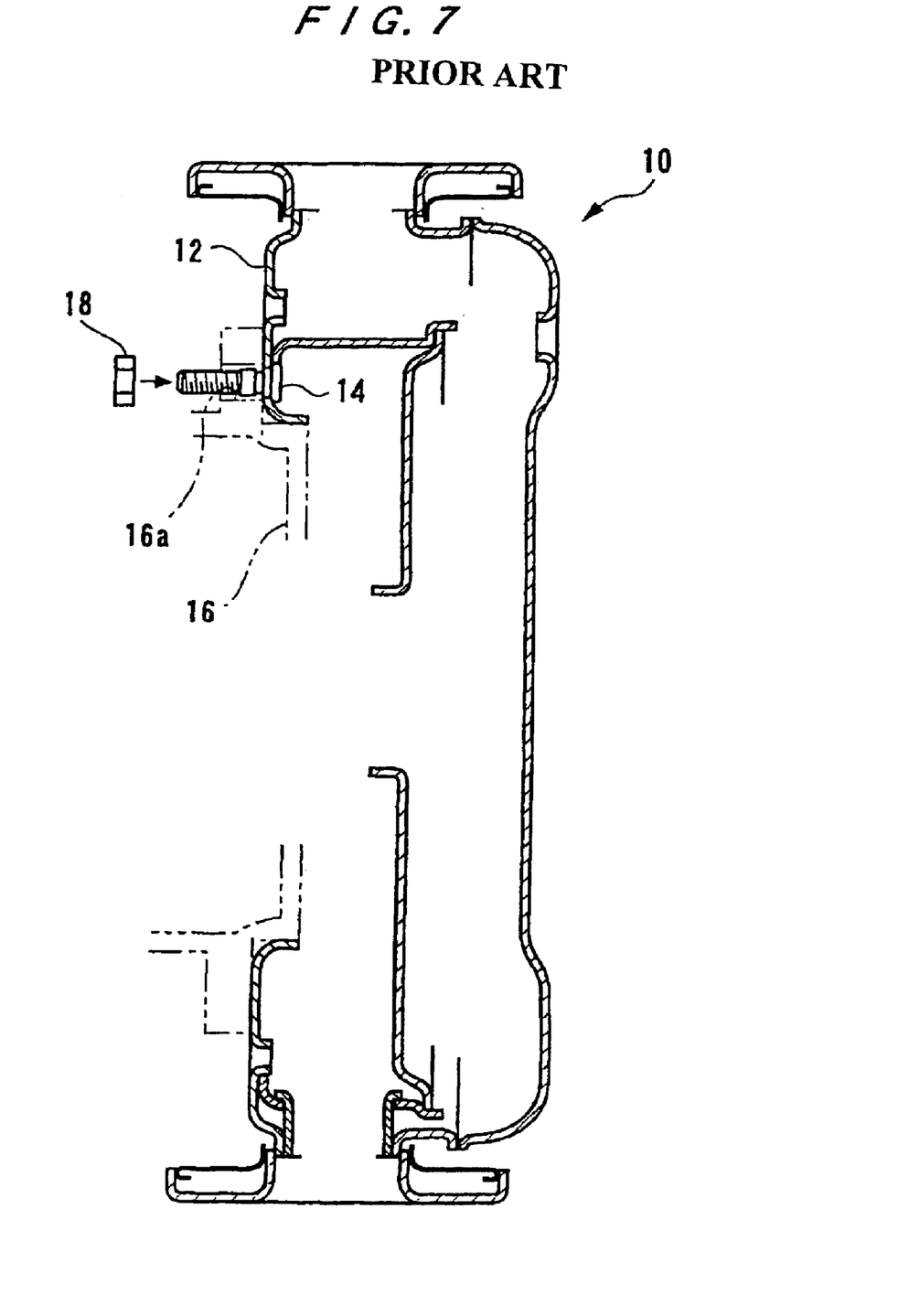
FIG. 7 is a cross-sectional view of a conventional pump casing (pressed pump casing).

Conventionally, in this kind of pump apparatus, as shown in FIG. 7, a pump casing (pressed pump casing) 10 composed of pressed products is prepared, and bolts 14 are fixed by welding or the like to a backside plate 12 of the pump casing 10 at predetermined positions on the circumference in a peripheral portion of the backside plate 12 such that shaft portions of the bolts 14 project from the backside plate 12 backwardly. Next, the shaft portions of thee bolts 14 are passed through through-holes 16a formed in a flange 16 of a motor, and the backside plate 12 is brought into contact with the flange 16 at the peripheral portion of the backside plate 12, and then nuts 18 are screwed onto the bolts 14 to fasten the backside plate 12 and the flange 16 together, thereby mounting the pump casing 10 onto the motor. This fastening method is also used for fastening another member to a plate having a complicate shape.

However, the work for fixing bolts to a plate having a complicate shape by welding or the like is inefficient, and is the major factor in causing an increase in production costs. Particularly, in the pump casing (pressed pump casing) composed of the pressed products manufactured by press-forming of sheet metal such as stainless steel plate, many welding operations and many components are necessary, and hence the working efficiency is extremely low. Although the pressed pump casing has been proposed for reduction of production costs, such pressed pump results in an increase in production costs all the more because of the above reason.

DISCLOSURE OF INVENTION

The present invention has been made in view of the above, and it is therefore an object of the present invention to provide a fastener and a fastening method which can efficiently and inexpensively join together a plate-like member having a complicate shape such as a pressed product constituting a part of a pump casing or the like, and another member.

Another object is to provide a pump apparatus comprising a motor and a pump casing which are joined together by the fastener.

According to an aspect of the present invention, there is provided a pump apparatus comprising: a pump casing having a plate-like member, a cap nut having a main body and a thin-walled portion projecting from the main body being fixed to the plate-like member by inserting the thin-walled portion into a through-hole of the plate-like member and caulking the thin-walled portion; and a motor having a flange, the pump casing being mounted on the motor by placing the flange of the motor on the plate-like member and joining together the flange and the plate-like member by screwing a bolt into the cap nut.

According to the present invention, a cap nut is fixed to a plate-like member of a pump casing by caulking, and a part of a cylindrical thin-walled portion formed on the cap nut is cut into recesses of a through-hole to thus prevent the cap nut from rotating. Therefore, a flange of a motor can be fastened to the plate-like member without performing inefficient welding operations. Particularly, by using the fastener of the present invention for fastening the motor and the pump casing (pressed pump casing) which is composed of pressed products manufactured by press-forming of sheet metal such as stainless steel plate and requires many welding operations and many components, the working efficiency can be improved by eliminating a part of welding operations, and the interior of the pump casing can be kept airtight or watertight by providing a seal member.

BEST MODE FOR CARRYING OUT THE INVENTION

A fastener and a fastening method according to embodiments of the present invention will be described below with reference to FIGS. 1 through 6.

Figure 1:
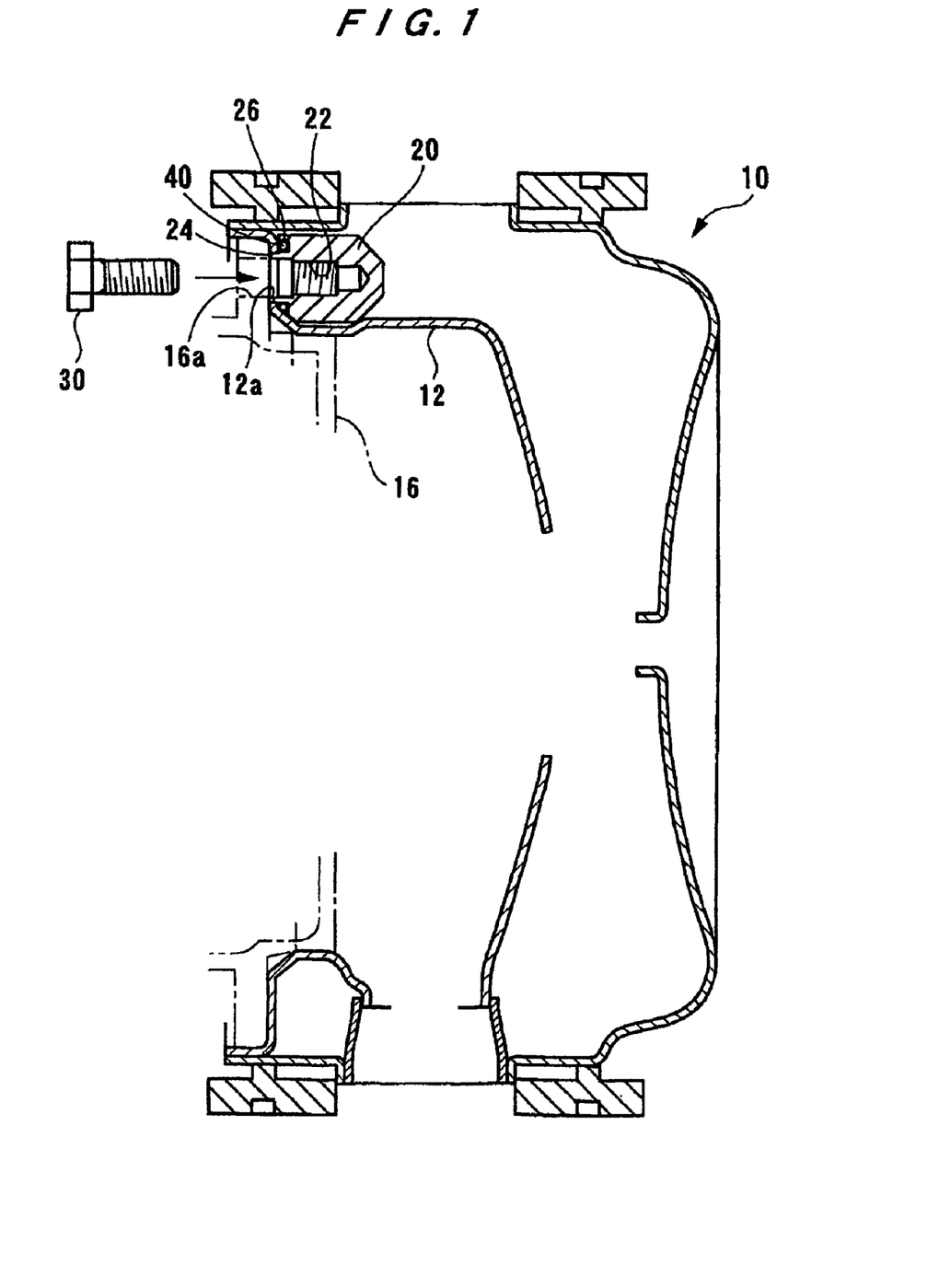
FIG. 1 is a cross-sectional view of a pump casing (pressed pump casing) to which a fastener according to an embodiment of the present invention is applied.
Figure 2:
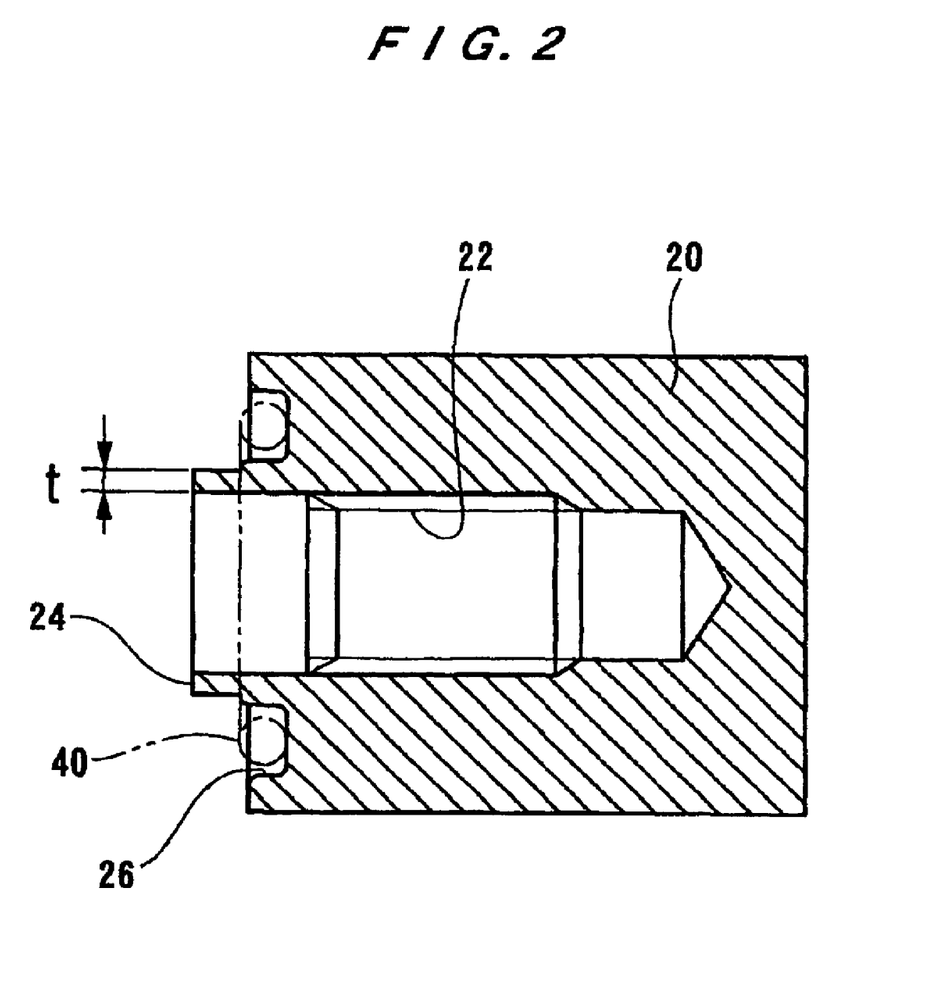
FIG. 2 is an enlarged cross-sectional view of a cap nut.

FIGS. 1 and 2 show a pump casing (pressed pump casing), composed of press products manufactured by press-forming of sheet metal such as stainless steel plate, to which a fastener according to an embodiment of the present invention is applied. As shown in FIG. 1, a fastener comprises a substantially cylindrical cap nut 20 fixed to a backside plate 12 which is one component of a pump casing (pressed pump casing) 10, and a bolt 30 which is screwed into the cap nut 20. The backside plate 12 is a plate-like member manufactured by press-forming and has a complicate shape.

As shown in FIG. 2, the cap nut 20 has a hole 22 which is open at one end and has a female screw in an inner circumferential surface thereof. The cap nut 20 has a cylindrical main body, and a cylindrical thin-walled portion 24 projecting from the cylindrical main body at the open end of the hole 22 and having a thickness t of, for example, about 1.5 mm. An annular groove 26 is formed in the cap nut 20 so as to surround the cylindrical thin-walled portion 24, and an annular seal member 40 comprising an elastic material is fitted into the annular groove 26, if necessary.

As shown in FIG. 1, the cylindrical thin-walled portion 24 is inserted into a through-hole 12a formed in the backside plate 12 in such a state that the seal member 40 is fitted into the annular groove 26, and then the cylindrical thin-walled portion 24 is caulked, whereby the cap nut 20 is securely fixed to the backside plate 12 of the pump casing 10 at a fluid passage side. A flange 16 which is a component of a motor is brought into contact with the backside plate 12 of the pump casing 10 in such a state that a through-hole 16a formed in the flange 16 is in alignment with the hole 22 of the cap nut 20, and then a bolt 30 is screwed into the cap nut 20 fixed to the backside plate 12 by caulking, whereby the pump casing 10 is mounted on the motor.

The through-hole 12a of the backside plate 12 has an unevenness (irregularity) comprising small projections and recesses at at least a part of the inner circumferential surface thereof. Thus, when the cylindrical thin-walled portion 24 of the cap nut 20 is caulked and expanded radially outwardly, a part of the cylindrical thin-walled portion 24 is deformed so as to engage the projections and recesses, thus preventing the cap nut 20 from rotating. Further, by this caulking, the annular seal member 40 is pressed to be deformed, thus keeping the interior of the pump casing 10 airtight or watertight. In FIG. 1, although only one cap nut 20 fixed to the backside plate 12 is shown, a plurality of cap nuts 20 are fixed at predetermined positions on the circumference in the peripheral portion of the backside plate 12. Thus, a plurality of bolts 30 which are screwed into the cap nuts 20 are also used.

In this manner, the cap nut 20 is fixed to the backside plate 12 by caulking, and a part of the cylindrical thin-walled portion 24 of the cap nut 20 is cut into the recesses of the through-hole 12a to thus prevent the cap nut 20 from rotating. Therefore, the flange 16 of the motor can be fastened to the backside plate 12 without performing inefficient welding operations. Particularly, by using the fastener of the present invention for fastening the motor and the pump casing (pressed pump casing) 10 which is composed of the pressed products manufactured by press-forming of sheet metal such as stainless steel plate and requires many welding operations and many components, the working efficiency can be improved by eliminating a part of welding operations, and the interior of the pump casing 10 can be kept airtight or watertight by providing the annular seal member 40.

Figure 3:
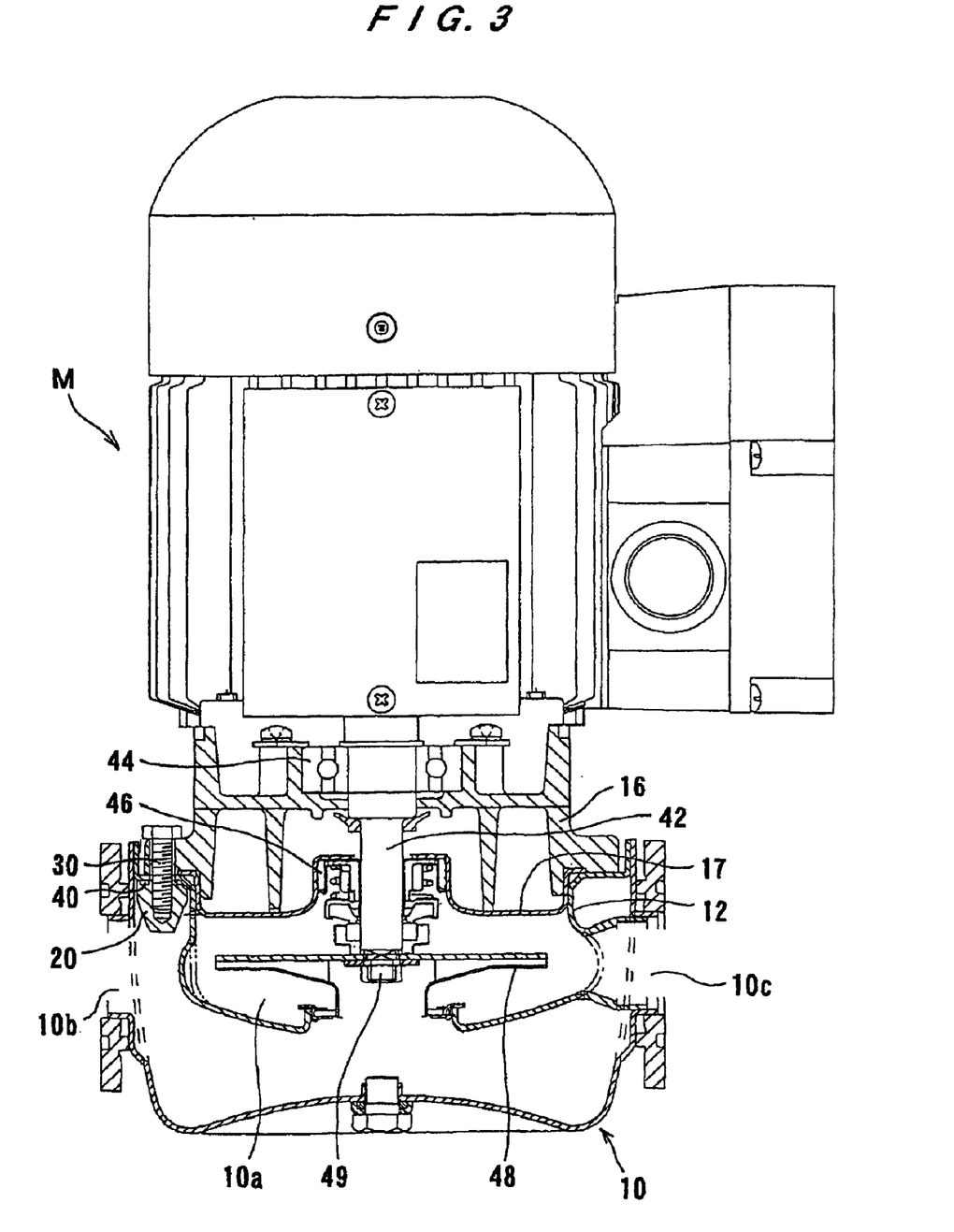
FIG. 3 is a front view with partially sectional portion of a pump apparatus to which the fastener according to the embodiment of the present invention is applied.

FIG. 3 shows a pump apparatus which is assembled by fastening a pump casing to a flange of a motor. As shown in FIG. 3, a motor M has a flange 16 attached to a motor frame and serving as a motor bracket, and a rotatable main shaft 42, and the main shaft 42 is rotatably supported by upper and lower bearings 44 (only the lower bearing 44 is shown in FIG. 3).

As described above, a plurality of cap nuts 20 are fixed by caulking to the backside plate 12 of the pump casing 10 at predetermined positions on the circumference in the peripheral portion of the backside plate 12, and bolts 30 are screwed into the cap nuts 20 to fasten the flange 16 and the backside plate 12, and hence the pump casing 10 is mounted on the flange 16 of the motor M.

In this example, the pump casing 10 has a casing cover 17, and a mechanical seal 46 is disposed at the location where the main shaft 42 passes through the casing cover 17, thereby sealing the gap between the casing cover 17 and the main shaft 42. The annular seal member 40 comprising an O-ring is fitted into the annular groove 26 to keep the interior of the pump casing 10 airtight or watertight.

The pump casing 10 has a pump chamber 10a defined by the backside plate 12 and the casing cover 17, and a suction port 10b and a discharge port 10c which communicate with the pump chamber 10a. As described above, when the pump casing 10 is mounted on the flange 16 of the motor M, a forward end portion of the main shaft 42 is located in the pump chamber 10a. An impeller 48 is fixed to the forward end portion of the main shaft 42 by a nut 49.

In the pump apparatus having the above structure, the main shaft 42 and the impeller 48 are integrally rotated by energizing the motor M, and a fluid (liquid) is sucked into the pump chamber 10a through the suction port 10b and pressurized by the impeller 48, and then discharged through the discharge port 10c to the outside.

Figure 4A:
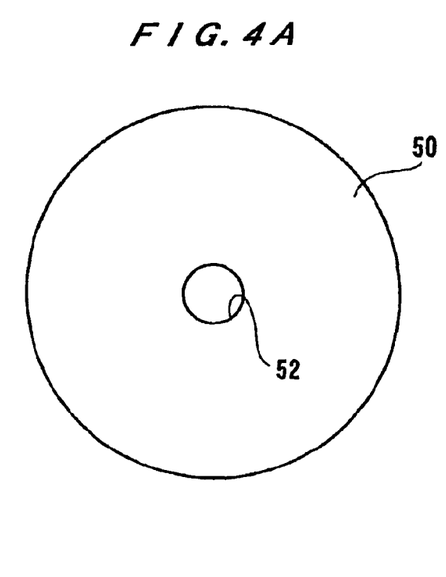
FIGS. 4A through 4D are schematic views showing one example of processes of fixing a cap nut to a plate-like member by caulking.
Figure 4B:
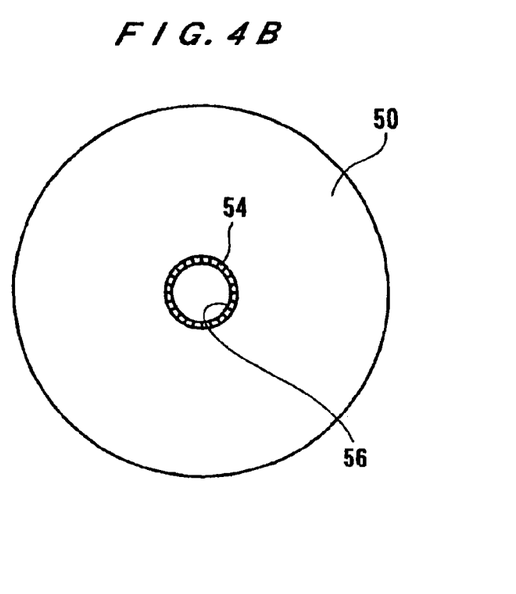
Figure 4C:
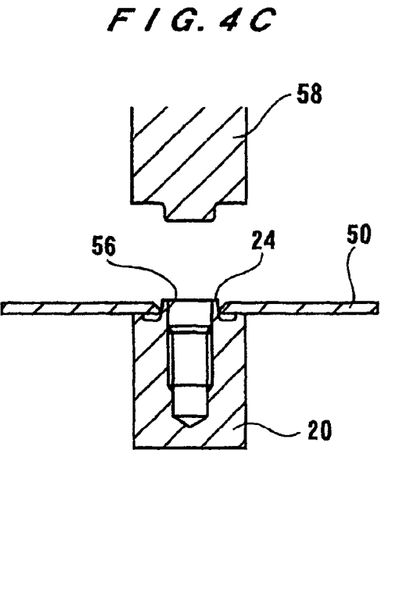
Figure 4D:
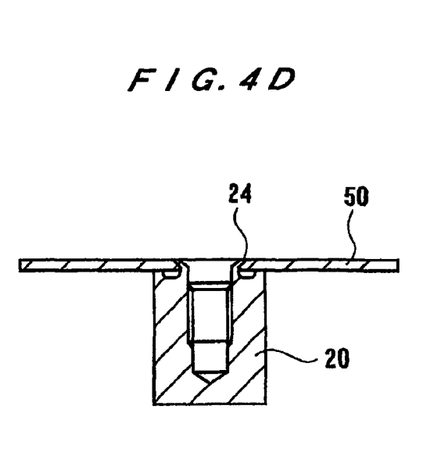

FIGS. 4A through 4D schematically show an example of processes for fixing the cap nut 20 to a plate 50. The plate 50 corresponds to the backside plate 12 shown in FIGS. 1 through 3. In this example, the height of the cylindrical thin-walled portion 24 of the cap nut 20 is substantially equal to the thickness of the plate 50. First, as shown in FIG. 4A, a hole 52 is formed in the plate 50 at a predetermined position of the plate 50 by punching, drilling or the like. Next, as shown in FIG. 4B, a through-hole 56 is formed so as to have a serration 54 in a front surface thereof by a serration operation of the prepared hole 52. Then, as shown in FIG. 4C, the cylindrical thin-walled portion 24 of the cap nut 20 is inserted from a backside of the plate 50 into the through-hole 56, and then the cylindrical thin-walled portion 24 is caulked, i.e., pressed to be expanded by pressing a punch 58 against the cylindrical thin-walled portion 24. Thus, the cap nut 20 is fixed by caulking to the plate 50 as shown in FIG. 4D. At this time, a part of the cylindrical thin-walled portion 24 is cut into the recesses of the serration 54 formed in the surface of the through-hole 56, thus preventing the cap nut 20 from rotating.

Figure 5A:
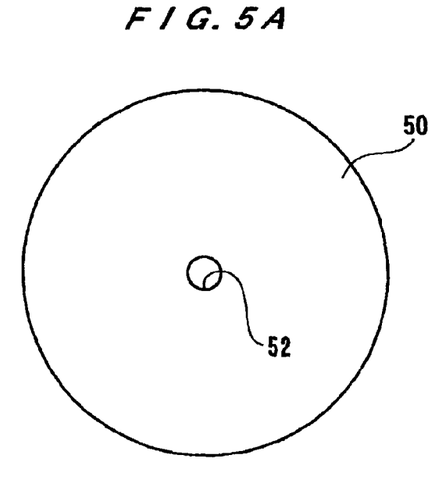
FIGS. 5A through 5D are schematic views showing another example of processes of fixing a cap nut to a plate-like member by caulking.
Figure 5B:
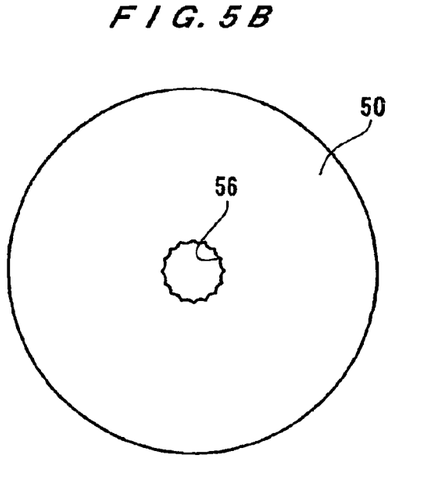
Figure 5C:
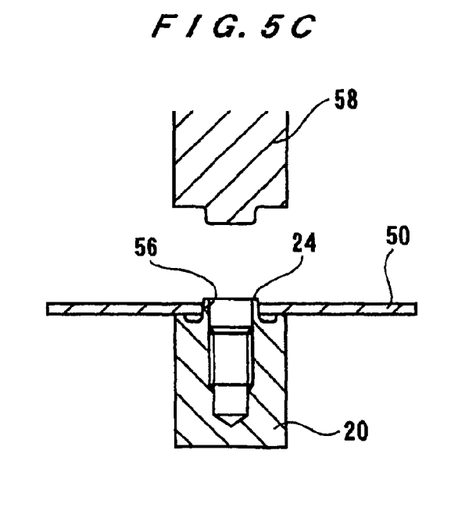
Figure 5D:
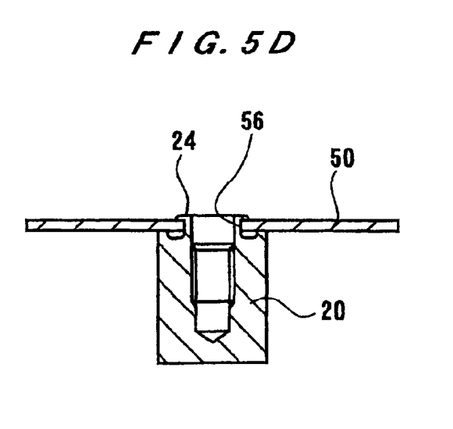

FIGS. 5A through 5D schematically show another example of processes for fixing the cap nut 20 to the plate 50. In this example, the height of the cylindrical thin-walled portion 24 of the cap nut 20 is higher than the thickness of the plate 50. First, as shown in FIG. 5A, a hole 52 is formed in the plate 50 at a predetermined position of the plate 50 by punching, drilling or the like. Next, as shown in FIG. 5B, a through-hole 56 is formed so as to have projections and recesses in an inner circumferential surface thereof by a piercing operation of the prepared hole 52. Then, as shown in FIG. 5C, the cylindrical thin-walled portion 24 of the cap nut 20 is inserted from a backside of the plate 50 into the through-hole 56, and then the cylindrical thin-walled portion 24 is caulked, i.e., pressed to be expanded by pressing a punch 58 against the cylindrical thin-walled portion 24. Thus, the cap nut 20 is fixed by caulking to the plate 50 as shown in FIG. 5D. At this time, a part of the cylindrical thin-walled portion 24 is deformed so as to follow the projections and recesses and to be cut into the recesses formed in the inner circumferential surface of the through-hole 56, thus preventing the cap nut 20 from rotating.

In the case where the fastener and the fastening method according to the present invention are applied to the pump casing (pressed pump casing) composed of the pressed products by press-forming sheet metal such as stainless steel plate, the pressed pump casings and the cast pump casings can be assembled by a common assembly line to thus improve a working efficiency.

Figure 6:
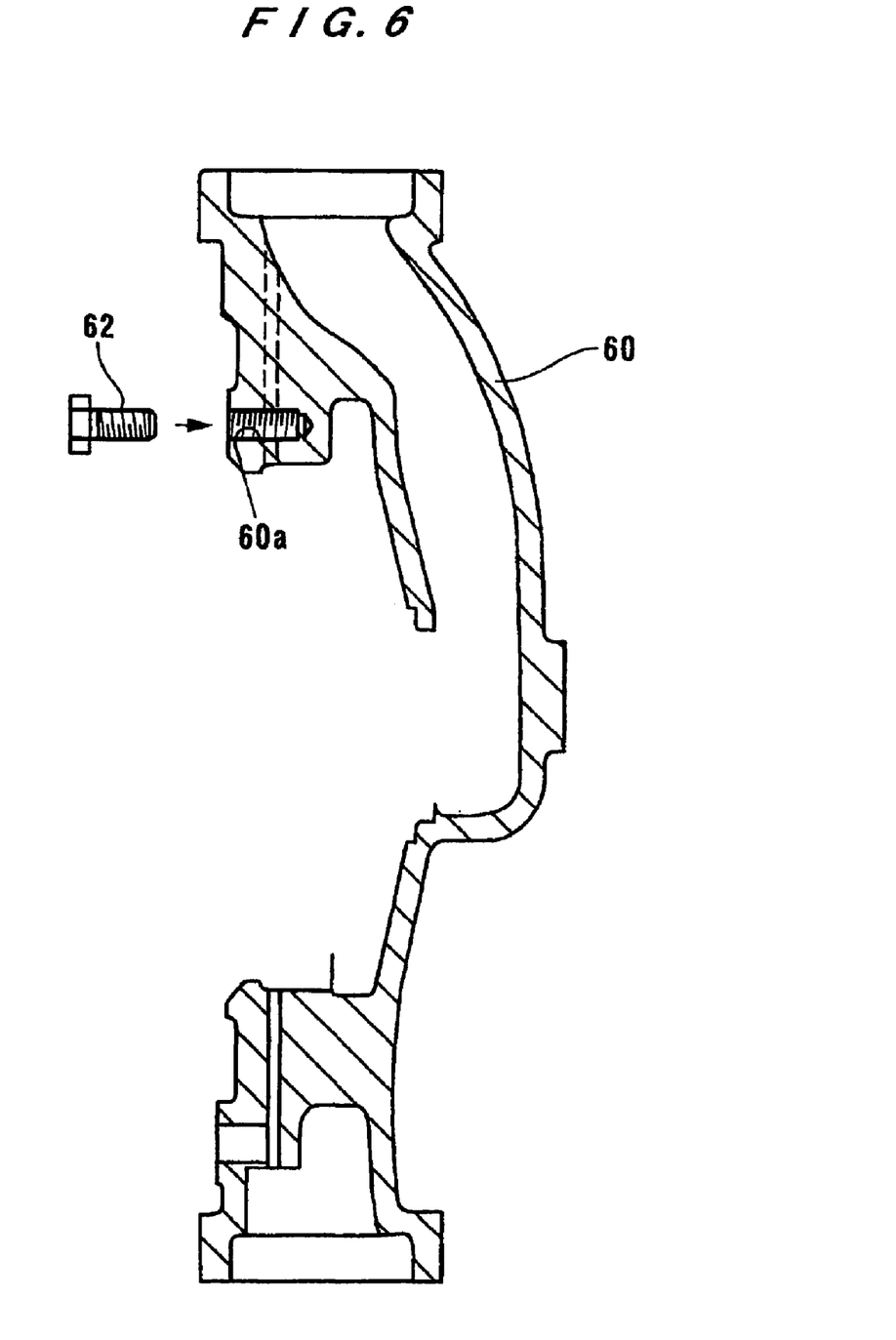
FIG. 6 is a cross-sectional view showing the assembly of a cast pump casing.

Specifically, in the cast pump casing, as shown in FIG. 6, tapped holes 60a are formed in a cast pump casing 60 at predetermined locations of a backside surface of the cast pup casing 60. The flange of the motor (not shown) is brought into contact with the cast pump casing 60, and bolts 62 are screwed into the tapped holes 60*a*. Thus, the cast pump casing 60 is mounted on the motor. Therefore, the bolts can be fastened from the same direction in both of the pressed pump casing and the cast pump casing, and hence it is possible to use the same assembly line in both of the pressed pump casing and the cast pump casing.

As described above, according to the present invention, a cap nut is fixed to a plate-like member by caulking, and a part of a cylindrical thin-walled portion of the cap nut is cut into an unevenness (projections and recesses) of a through-hole of the plate-like member to thus prevent the cap nut from rotating. Thus, another member can be fastened to the plate-like member without performing inefficient welding operations.

INDUSTRIAL APPLICABILITY

The present invention relates to a fastener and a fastening method for joining together two or more members including at least one complicate-shaped plate. The present invention can be utilized in joining a component of a pump casing manufactured by press-forming and a flange of a motor in a pump apparatus.

What is claimed is:

1. A pump apparatus comprising:
   a pump casing having a plate-like member, a cap nut having a main body and a thin-walled portion projecting from said main body being fixed to said plate-like member by inserting said thin-walled portion into a through-hole of said plate-like member and caulking said thin-walled portion; and
   a motor having a flange, said pump casing being mounted on said motor by placing said flange of said motor on said plate-like member and joining together said flange and said plate-like member by screwing a bolt into said cap nut.

2. A pump apparatus according to claim 1, further comprising a seal member interposed between said plate-like member of said pump casing and said cap nut.

3. A pump apparatus comprising:
   a pump casing manufactured by press-forming and having a plate-like member;
   a cap nut fixed to said plate-like member and provided within said pump casing so as to be located at a fluid passage side of said pump casing; and
   a motor having a flange, said pump casing and said flange of said motor being fastened by said cap nut and a bolt screwed into said cap nut.

4. A pump apparatus according to claim 3, further comprising a seal member interposed between said plate-like member of said pump casing and said cap nut.

5. A pump apparatus comprising:
   a pump casing manufactured by press-forming and having a plate-like member;
   a cap nut fixed to said plate-like member at a fluid passage side of said pump casing; and
   a motor having a flange, said pump casing and said flange of said motor being fastened by said cap nut and a bolt screwed into said cap nut,
   wherein said cap nut has a main body and a thin-walled portion projecting from said main body;
   said plate-like member has a through-hole, said plate-like member having projections and recesses at at least a part of an inner circumferential surface of said through-hole; and
   said cap nut is fixed to said plate-like member by inserting said thin-walled portion into said through-hole of said plate-like member and caulking said thin-walled portion.

* * * * *